Figures 1, 2:
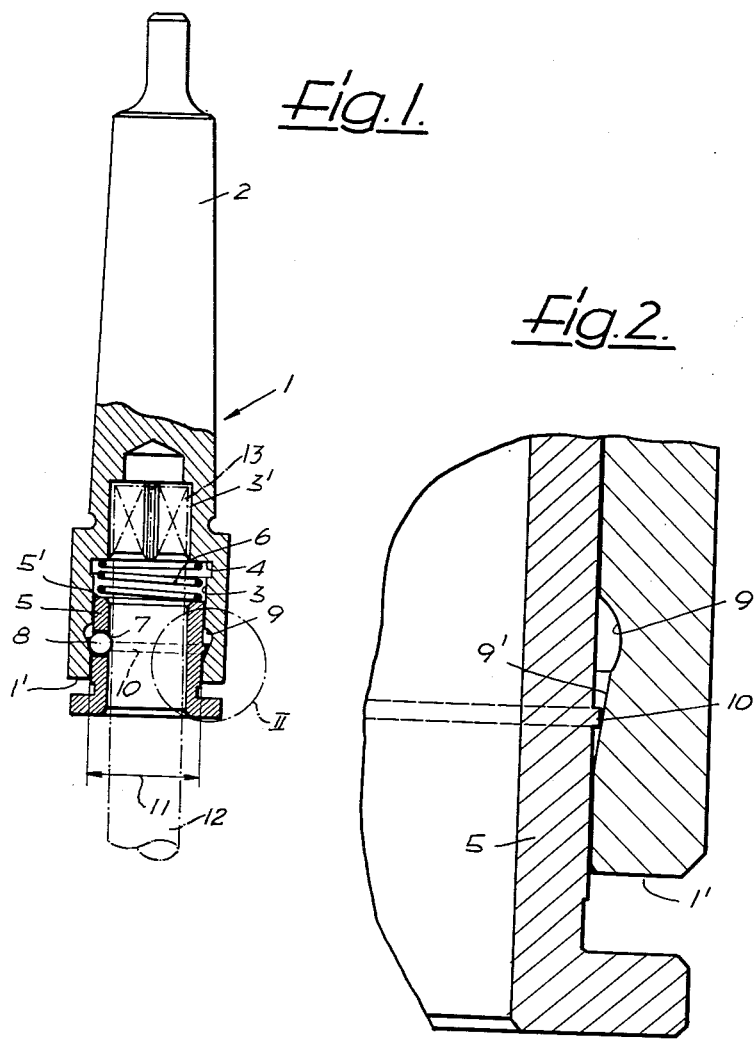

United States Patent Office 3,039,781
Patented June 19, 1962

3,039,781
TOOL CHUCK
Otto Bilz, Holderlinweg 61, Esslingen, Land Baden-Wurttemberg, Germany
Filed Dec. 6, 1960, Ser. No. 74,098
Claims priority, application Germany Oct. 18, 1960
7 Claims. (Cl. 279—75)

The present invention relates to a chuck for tools and especially for taps.

In the conventional chucks, the body of the chuck is provided with an axially extending bore into which the shaft of the respective tool is to be inserted. For transmitting the rotary movement of the chuck to the tool, the mentioned bore in the chuck has a non-circular inner end of a cross-sectional shape which corresponds to the shape of the end of the tool shaft. For preventing the tool from falling out of the chuck, it is also known to provide this bore in the body of the chuck with a bushing which, when the tool is being inserted into this bushing, is slidable inwardly in the axial direction against the action of a spring. The cylindrical wall of this bushing is provided with radial apertures for holding locking elements, for example, locking balls of a diameter greater than the thickness of the wall of the bushing so that when the tool is inserted into the bushing the balls will be forced outwardly and the parts of the balls projecting toward the outside of the bushing will engage with the bottom of a recess in the wall of the bore, for example, with a substantially conical bottom surface of an annular groove in the wall of the bore which converges toward the outer end of the bore. When a tool shaft is inserted into such a chuck, it will be secured therein by the locking elements against an axial force which tends to eject the tool shaft from the bore in the chuck.

In order to prevent the bushing from being forced out of the bore in the chuck as a result of its own weight and by the force of the spring, it is also known to provide the outer wall of the bushing with an axially extending groove into which a threaded pin engages which is screwed into a radial bore in the body of the chuck. Apart from the fact that it is difficult to provide the wall of the bushing with such an axial groove of a limited length, this type of construction also has the disadvantage that, in the event that the tool shaft is improperly inserted into the chuck, a relative rotation may occur between the chuck and the tool shaft with the result that the locking pin may be easily sheared off. The necessary replacement of the locking pin and especially the removal of the broken pin, if at all possible, is in any event a time-wasting operation which interrupts production.

It is an object of the present invention to provide a chuck which overcomes the above-mentioned disadvantages.

Another object of the invention consists in providing the simplest possible means for securing the bushing within the axial bore in the body of the chuck.

A further object of the invention consists in utilizing the resilient movability of the bushing relative to the body of the chuck for locking the bushing within the axial bore of the chuck by a connection similar to that as attained by a snap button by providing the outer wall of the bushing with at least one projection which increases the diameter of the bushing at this point so as to be larger than the smallest diameter of the part of the wall of the axial bore which is disposed in front of this projection. Consequently, the projection will then prevent the bushing from being pushed out of the bore.

These and further objects of the invention will become more clearly apparent from the following detailed description, particularly when the same is read with reference to the accompanying drawings, in which:

FIGURE 1 shows, partly in section, a side view of one embodiment of a chuck according to the invention and of a part of a tool to be mounted in the chuck; while FIGURE 2 shows an enlarged cross section of a part of FIGURE 1 as indicated by the line II therein.

As illustrated in the drawings, the chuck according to the invention consists of a chuck body 1, one end of which forms a shaft 2 for engaging in a corresponding bore in a spindle, not shown, of a machine tool, while the other end is provided with an axially extending bore 3 into which the end of a tool shaft 12 may be inserted. For transmitting the rotation of the chuck body 1 to the tool 12, bore 3 has near its inner end a portion 3' of a smaller diameter and a noncircular cross section, for example, a square cross section, in accordance with the size and shape of the end 13 of tool shaft 12.

The wider outer end of bore 3 has a circular cylindrical cross section which is separated from the smaller noncircular end 3' by a flangelike supporting surface 4. This cylindrical part of bore 3 contains a bushing 5 which is slidable in the axial direction along the wall of bore 3 and the inner end surface 5' of which is acted upon by a compression spring 6, the inner end of which rests on the supporting surface 4.

The wall of bushing 5 is provided with a plurality of radial apertures 7, for example, three, which are spaced at equal distances from each other and each of which contains a steel ball 8. These balls which serve as locking elements have a diameter which is slightly greater than the thickness of the wall of bushing 5 so that when balls 8 are in alignment, for example, with the inner surface of the wall of bushing 5, they project slightly outwardly of the outer surface of the bushing or vice versa. In order to prevent balls 8 from falling out of the radial apertures 7 toward the inside of bushing 5, when no tool 2 is inserted therein, the diameter of apertures 7 at the inner surface of the wall of bushing 5 is made slightly smaller than the diameter of balls 8. The wall of bore 3 adjacent to apertures 7 is provided with an annular groove 9, the bottom 9' of which is substantially of a conical shape and converges toward the end 1' of the chuck body 1 until it merges with the inner wall surface of bore 3.

The outer wall surface of bushing 5 is provided with a small flange 10 which has an outer diameter slightly larger than the minimum inner diameter 11 of the part of bore 3 in front of flange 10. As indicated in FIGURE 1, flange 10 is disposed at substantially the same plane as the radial apertures 7, and it is therefore interrupted at the positions of apertures 7.

Flange 10 is made of such an outer diameter that, since the diameter of bore 3 diminishes in front of the flange, bushing 5 cannot be pushed or pulled out of bore 3 either by the action of spring 6 or by its own weight. On the other hand, the diameter of flange 10 is made sufficiently small so as to permit the entire bushing 5, because of the elasticity of the wall of bore 3 of bushing 5, to be inserted like a snap button into bore 3. Since flange 10 lies substantially within the same plane as apertures 7, it will not limit the amount of movability of bushing 5 in the axial direction which is required for insuring the proper locking action of balls 8 on the outer surface of tool shaft 12 under the action of spring 6.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. In a chuck having a body with an axially extending bore in one end thereof, said bore comprising an outer part and a narrower inner part, at least said inner part having a noncircular cross section adapted to receive the noncircular end of a tool shaft, and an inner shoulder intermediate said two parts, a bushing mounted within said outer part and having inner and outer peripheral surfaces and inner and outer end surfaces, said inner surface having a diameter substantially corresponding to the diameter of said tool shaft, said outer surface having a diameter substantially corresponding to the diameter of said outer part of said bore and adapted to slide in the axial direction within said outer part, a compression spring within said outer part of said bore acting at one end upon said shoulder and at the other end upon the inner end surface of said bushing, the inner wall surface of said outer part of said bore having at least one recess therein, the bottom of said recess gradually tapering in the direction toward said end of said chuck body so as to merge near said end with the inner surface of said outer part of said bore, said bushing having at least one radial aperture extending through the wall thereof, at least one locking member having a radial length greater than the thickness of said wall of said bushing and being slidable in a radial direction within said aperture and adapted under the action of said spring upon said bushing to clamp with its inner surface against the outer surface of said tool shaft by being pressed outwardly by said shaft against the tapered bottom of said groove, and at least one projection on the outer wall surface of said bushing increasing the diameter of said bushing at least at one point thereof so as to be greater at said point than the minimum diameter of the part of said bore in front of said projection, so that said projection will prevent said bushing from being pushed out of said bore.

2. In a chuck as defined in claim 1, in which said outer part of said bore and the inner and outer peripheral surfaces of said wall of said bushing have cylindrical cross sections, said inner peripheral surface adapted to receive a cylindrical part of said tool shaft adjacent to said noncircular end portion, said recess in the inner wall surface of said outer part of said bore forming an annular groove.

3. In a chuck as defined in claim 1, in which said projection on said outer wall surface of said bushing forms a flange.

4. In a chuck as defined in claim 2, in which said projection on said outer wall surface of said bushing forms an annular flange of uniform dimensions which engages into said annular groove.

5. In a chuck as defined in claim 2, in which said bushing is provided with a plurality of said apertures, each forming a circular bore and with a plurality of said locking members, each comprising a steel ball, each of said bores containing one of said balls and, except at the inner end of said bore, having a diameter slightly larger than the diameter of said ball to permit said ball to slide in the radial direction within said bore, said inner end of said bore having a diameter slightly smaller than the diameter of said ball so as to prevent said ball from falling out of said bore when no tool shaft is inserted into said bushing.

6. In a chuck as defined in claim 3, in which said apertures in said bushing are disposed substantially within the same plane as said flange.

7. In a chuck as defined in claim 5, in which said projection on said outer wall of said bushing forms an annular flange of uniform dimensions which engages into said annular groove, said bores being disposed substantially within the same plane as said flange and interrupting said flange.

References Cited in the file of this patent
UNITED STATES PATENTS 2,597,816  Podjaski _____ May 20, 1952
2,684,491  Roddick _____ July 27, 1954